United States Patent [19]

Miura et al.

[11] Patent Number: 4,511,973
[45] Date of Patent: Apr. 16, 1985

[54] NAVIGATOR FOR VEHICLES

[75] Inventors: Kunio Miura, Okazaki; Takashi Ono, Kariya, both of Japan

[73] Assignee: Nippondenso Co., Ltd., Kariya, Japan

[21] Appl. No.: 409,855

[22] Filed: Aug. 20, 1982

[30] Foreign Application Priority Data

Aug. 24, 1981 [JP] Japan .................................. 56-133088
Oct. 22, 1981 [JP] Japan .................................. 56-169071

[51] Int. Cl.³ ........................ G06F 15/50; G09B 29/10
[52] U.S. Cl. ..................................... 364/449; 364/424; 364/521; 343/451; 340/990; 340/995; 73/178 R
[58] Field of Search ............... 364/424, 443, 444, 449, 364/521; 353/11, 12; 343/450–453; 73/178 R; 340/988–990, 992, 995, 996, 709

[56] References Cited

U.S. PATENT DOCUMENTS

| | | | |
|---|---|---|---|
| 3,653,031 | 3/1972 | Hlady et al. | 343/452 |
| 3,760,360 | 9/1973 | Reynolds et al. | 340/995 |
| 4,028,695 | 6/1977 | Saich | 340/709 |
| 4,063,223 | 12/1977 | Schlig et al. | 340/709 |
| 4,071,895 | 1/1978 | Wood et al. | 364/449 |
| 4,086,632 | 4/1978 | Lions | 343/452 |
| 4,139,889 | 2/1979 | Ingels | 340/989 |
| 4,152,693 | 5/1979 | Ashworth, Jr. | 340/990 |
| 4,393,448 | 7/1983 | Dunn et al. | 364/449 |
| 4,400,780 | 8/1983 | Nagao et al. | 364/449 |

FOREIGN PATENT DOCUMENTS 55-159299 12/1980 Japan .

Primary Examiner—Gary Chin
Attorney, Agent, or Firm—Cushman, Darby & Cushman

[57] ABSTRACT

In a navigator for use on a road vahicle, a memory is responsive to an external switch operation to preliminarily store any specific point on a map and a controller is responsive to the generation of a move command to move a cursor indicative of the present position of the vehicle to the specific point stored in the memory. In this way, by preliminarily entering any specific point into the memory, it is possible to easily set the position of the vehicle to the stored specific point.

3 Claims, 17 Drawing Figures

NAVIGATOR FOR VEHICLES

The present invention relates to a navigator for vehicles which displays the present position of a vehicle on the display surface of a road map.

The apparatus of this type heretofore known in the art include for example "a travelling position display apparatus for vehicles" disclosed in Japanese Laid-Open Patent Publication No. 55-159299 and this apparatus displays the present position of a vehicle on the display surface of a road map.

However, this apparatus is disadvantageous in that since the indicator lamps arranged on a display surface of a transparent film printed with a road map are successively lighted in response to the traveling of a vehicle through a setting operation of the transparent film, the setting operation of the transparent film is much troublesome and it is also troublesome to operate switches so as to manually adjust a vehicle position indicative cursor vertically and laterally to a corresponding position on the transparent film at the start of the operation of the vehicle.

With a view to overcoming the foregoing deficiencies in the prior art, it is the primary object of this invention to provide an improved navigator for vehicles in which any specific point on a map is memorized preliminarily through an external switch operation such that a vehicle's travel position indicative cursor is moved to the specific point in response to a move command and thus the position of the vehicle is easily settable to the specific point inputted preliminarily.

The present invention will become more apparent from the following description taken in conjunction with the accompanying drawings, in which.

Figure 1:
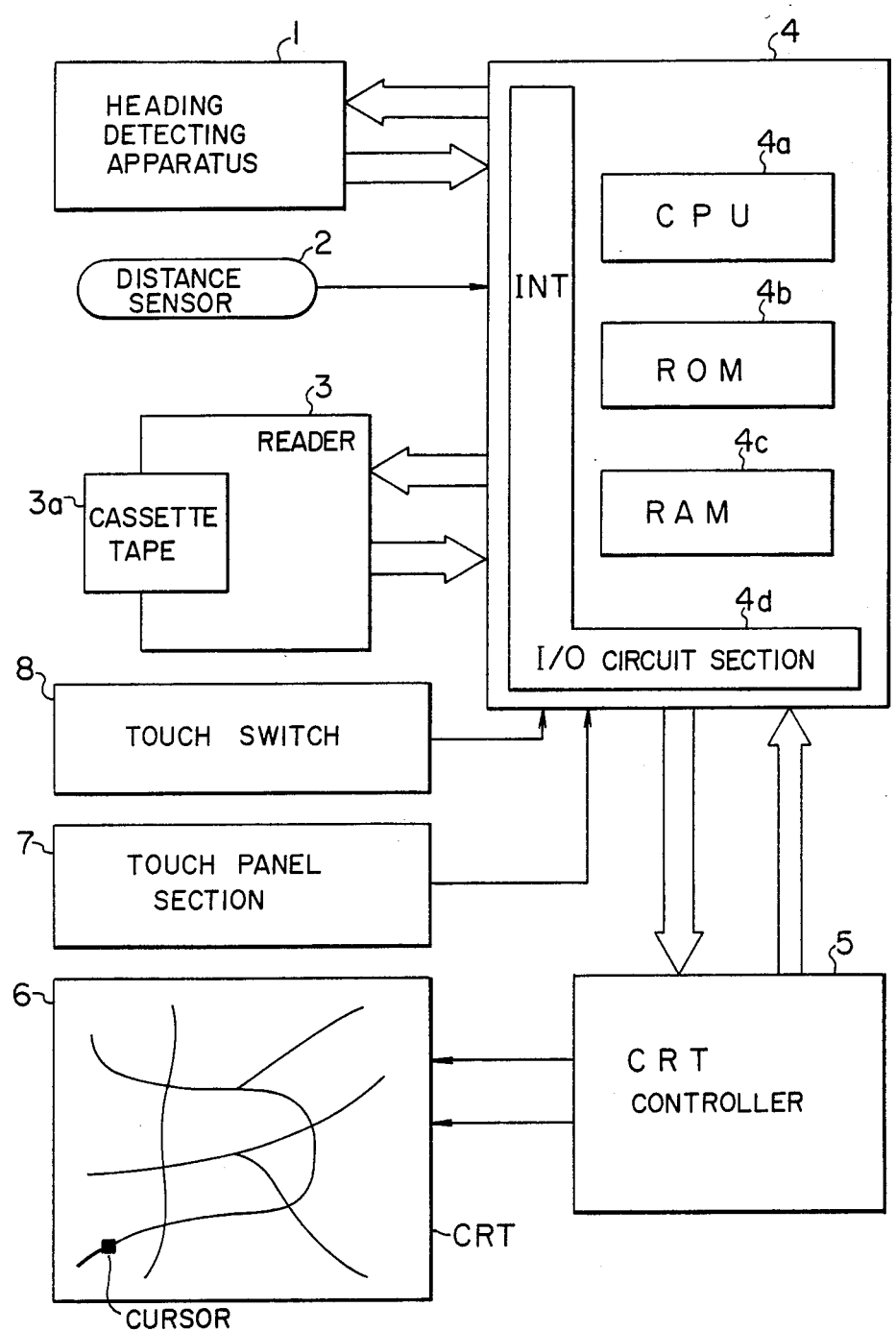
FIG. 1 is a block diagram showing the overall construction of a first embodiment of the invention.

The present invention will now be described with reference to the illustrated first embodiment. FIG. 1 is a block diagram showing the overall construction of the first embodiment. In the Figure, numeral 1 designates a heading detecting apparatus comprising a heading sensor for detecting the X and Y components of the earth's magnetic field corresponding to the heading of a vehicle and A/D converters for converting the signals from the heading sensor to digital signals, thereby generating the X-component and Y-component digital signals corresponding to the heading of the vehicle. Numeral 2 designates a distance sensor for generating a distance pulse each time the vehicle travels a unit distance (e.g., about 39.2 cm). Numeral 3 designates a reader responsive to the setting of a cassette tape 3a forming memory means storing the map data of a plurality of sections (including the absolute coordinates data of the upper right points of the respective maps) to search and read the map data of selected one of the sections.

Numeral 4 designates a microcomputer for performing software digital computational operations in accordance with a predetermined control program, which comprises a CPU 4a, an ROM 4b, an RAM 4c and an I/O circuit section 4d and comes into operation in response to the stabilized voltage supplied from a stabilized power supply circuit (not shown) adapted to generate a stabilized voltage of 5 volts from the power supplied from the vehicle battery, thereby receiving the X-component and Y-component digital signals from the heading detecting apparatus 1, the distance pulses from the distance sensor 2 and the signals read from the reader 3 and performing the necessary computational operations to generate display signals for displaying a selected section, travel path data, etc. The RAM 4c is backed up by the supply voltage always supplied from the vehicle battery. Numeral 5 designates a cathode ray tube (CRT) controller responsive to the display signals from the microcomputer 4 so that the map data, travel path data and characters of the selected section are separately stored and the necessary video signal and synchronizing signals for displaying the stored map data and travel path data or the characters on a CRT display are generated. Numeral 6 designates the CRT display unit forming display means responsive to the video signal and synchronizing signals from the CRT controller 5 to display the map of the selected section and the travel path or the characters on the CRT display. Numeral 7 designates a touch panel section forming position setting means mounted on the screen of the CRT display unit 6 and divided into 12 touch areas, whereby when selected one of the touch areas is operated by touching, the corresponding serial signal is generated. Numeral 8 designates a reset type touch switch forming second position setting means positioned near the CRT display unit 6. The heading detecting apparatus 1, the distance sensor 2, the reader 3, the microcomputer 4 and the CRT controller 5 form control means.

Figure 2:
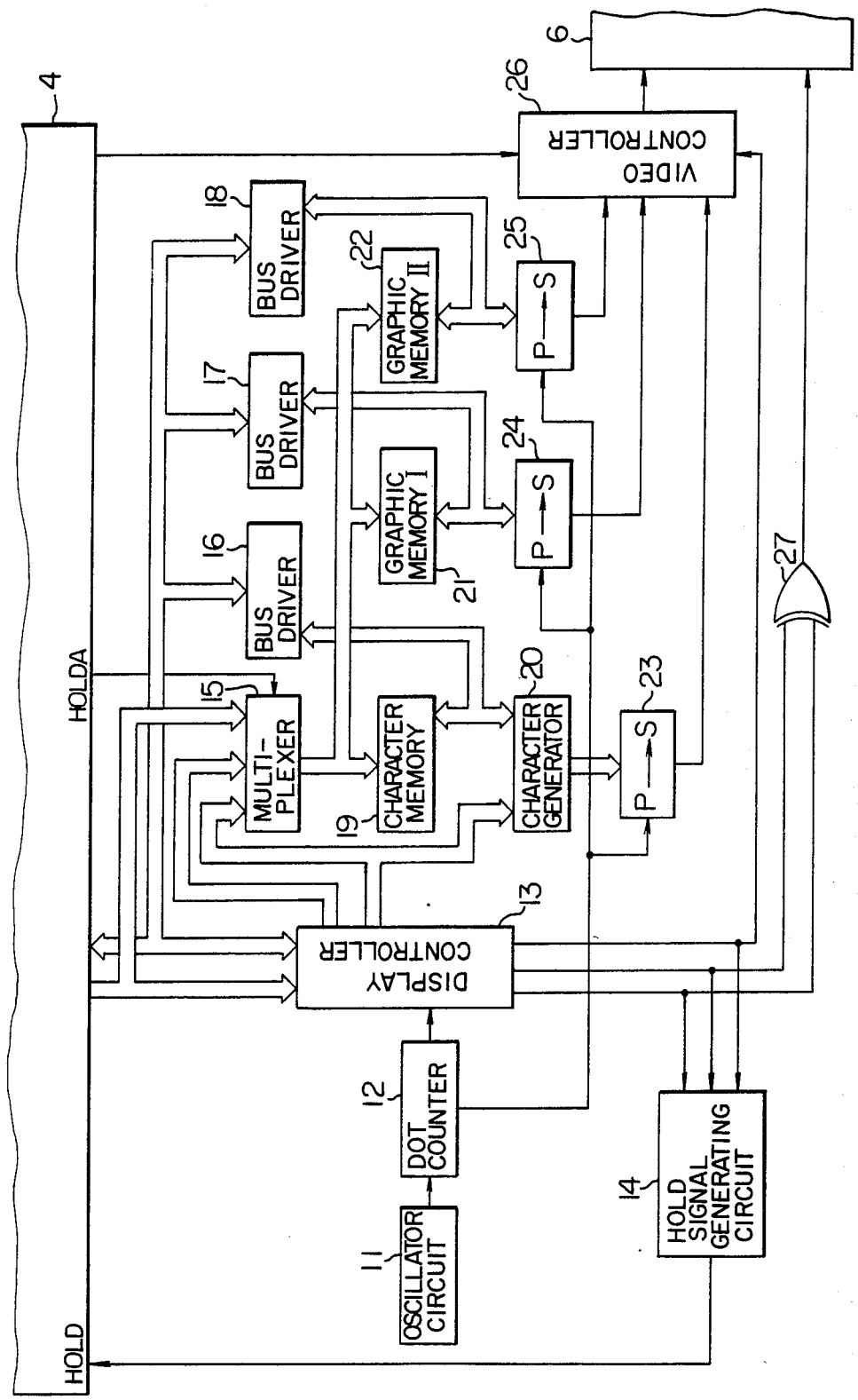
FIG. 2 is a detailed wiring diagram of the CRT controller shown in FIG. 1.

Next, the detailed wiring diagram of the CRT controller 5 shown in FIG. 2 will be described. Numeral 11 designates an oscillator circuit for generating an oscillation signal of 12.096 MHz, 12 a dot counter for dividing the frequency of the oscillation signal from the oscillator circuit 11 to generate 6.048 MHz dot timing clocks and 756 KHz character timing clocks, 13 a display controller responsive to the commands from the microcomputer 4 and the character timing clocks from the dot counter 12 to generate horizontal and vertical synchronizing signals, display timing signal, refresh memory address signal and raster address signal, and 14 a hold signal generating circuit responsive to the horizontal and vertical synchronizing signals from the display controller 13 to generate a hold signal for holding the microcomputer 4 during the display period at its HOLD terminal. Numeral 15 designates a multiplexer responsive to a hold acknowledge signal from the microcomputer 4 to make a change-over between the address signal from the microcomputer 4 and the refresh memory address signal and the raster address signal from the display controller 13, and 16, 17 and 18 bus drivers with 3-state outputs for changing the direction of data between the microcomputer 4 and display memories. Numeral 19 designates a character memory for storing the display data such as the ASCII code from the microcomputer 4 and receiving the refresh memory address signal from the display controller 13 to generate its content as an address, and 20 a character generator responsive to the display address from the character memory 19 and the raster address signal from the display controller 13 to generate a display pattern. Numeral 21 designates a first graphic memory for storing the map data from the microcomputer 4, 22 a second graphic memory for storing the travel path data (travel track data and present position data) from the microcomputer 4, and 23, 24 and 25 parallel-to-serial (P→S) converters for converting the parallel signals from the character generator 20 and the first and second graphic memories 21 and 22 to serial data in response to the dot timing clocks. from the dot counter 12. Numeral 26 designates a video controller responsive to the image selection signal from the microcomputer 4 to effect the switching in reception between the signal from the P→S converter 23 and the signal from the P→S converter 24 or 25 and select a graphic or character image and also responsive to the display timing signal from the display controller 13 to generate a video signal. Numeral 27 designates an exclusive OR circuit responsive to the horizontal and vertical synchronizing signals from the display controller 13 to generate synchronizing signals. The character memory 19 and the first and second graphic memories 21 and 22 are backed up by the voltage always supplied from the vehicle battery.

In other words, the CRT controller 5 is responsive to the data transmitted from the microcomputer 4 so that at all times the character memory 19 stores the character data, the first graphic memory 21 stores the map data and the second graphic memory 22 stores the travel track and present position display data, and the CRT controller 5 is also responsive to the image selection signal from the microcomputer 4 so that a graphic image (one for displaying the travel track and the present position on the map) or a character image (one for displaying for example the designation characters to select a section) and the necessary video signal and synchronizing signals for CRT display of the image corresponding to the selection are applied to the CRT display unit 6.

Figure 3:
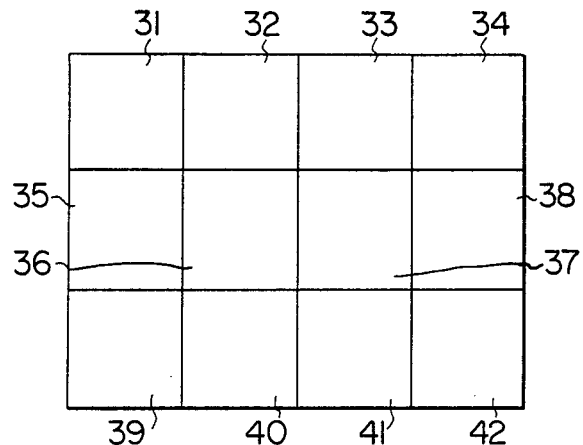
FIG. 3 is a diagram for explaining the touch areas of a touch panel section.

As shown in FIG. 3, the touch panel section 7 is divided into twelve touch areas 31 to 42 and it comprises two sheets of glass and a transparent conducting film formed in matrix form on each of the glass sheets. Thus, when selected one of the touch areas is depressed, the selected touch area is detected in response to the contact between the matrix transparent conducting films due to the deformation of the glass sheet and a touch signal generating circuit which is not shown generates a serial signal (comprising a start signal and a touch data signal) corresponding to the detected touch area. Note that the touch signal generating circuit generates the then current touch data in the form of a serial signal at intervals of 40 msec.

Figure 4:
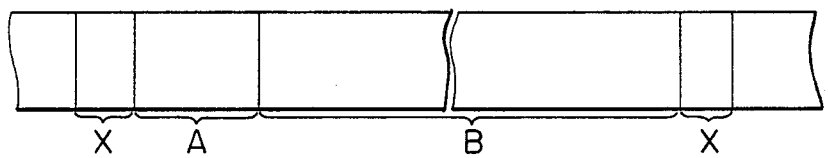
FIG. 4 is a diagram showing a data area of a cassette tape.

Referring to FIG. 4, there is illustrated the data area of the cassette tape 3a corresponding to one section, in which designated at A is a header part storing the data of the absolute coordinates (the coordinates with respect to the North Pole) of the upper right point on the map of the section and the relative coordinate data for the relative positions (the map upper right points) of a plurality of specific points in the map (e.g., major intersections, interchanges, etc.), B a map data storage portion storing the map data of the section and X blank portions. As a result, by causing the reader 3 to read the A and B portions, it is possible to supply the map data, absolute coordinate data and specific point relative coordinate data of the selected section to the microcomputer 4.

Figure 6:
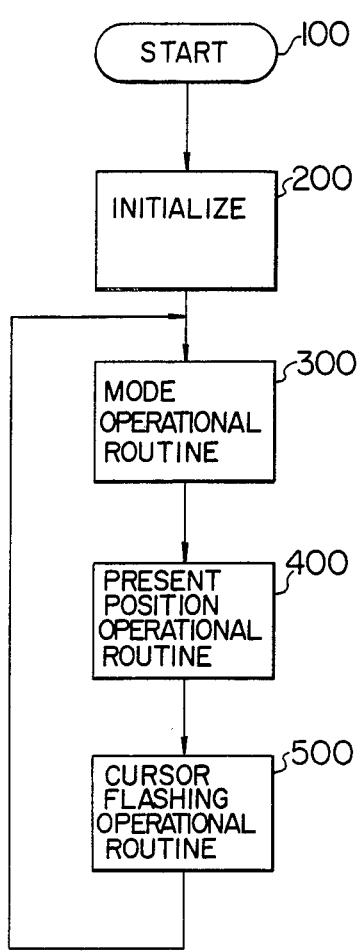
FIG. 6 is an operational flow chart showing the overall operational routines of a main routine of a microcomputer.
Figure 7:
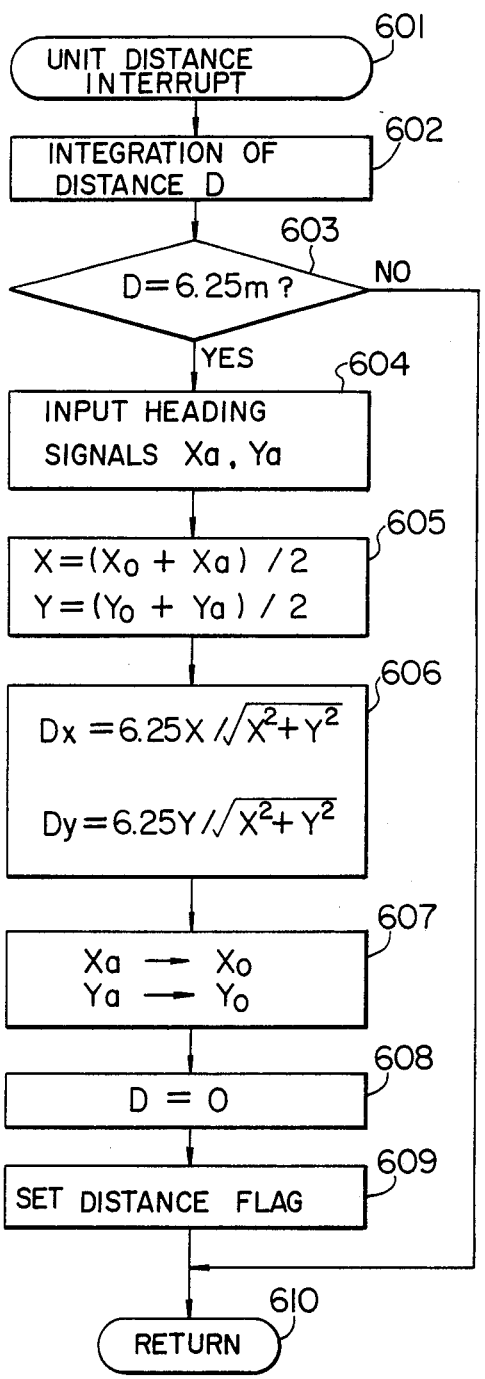
FIG. 7 is an operational flow chart showing the computational operations of an interrupt operational routine executed in response to a distance pulse from a distance sensor 2.
Figure 8:
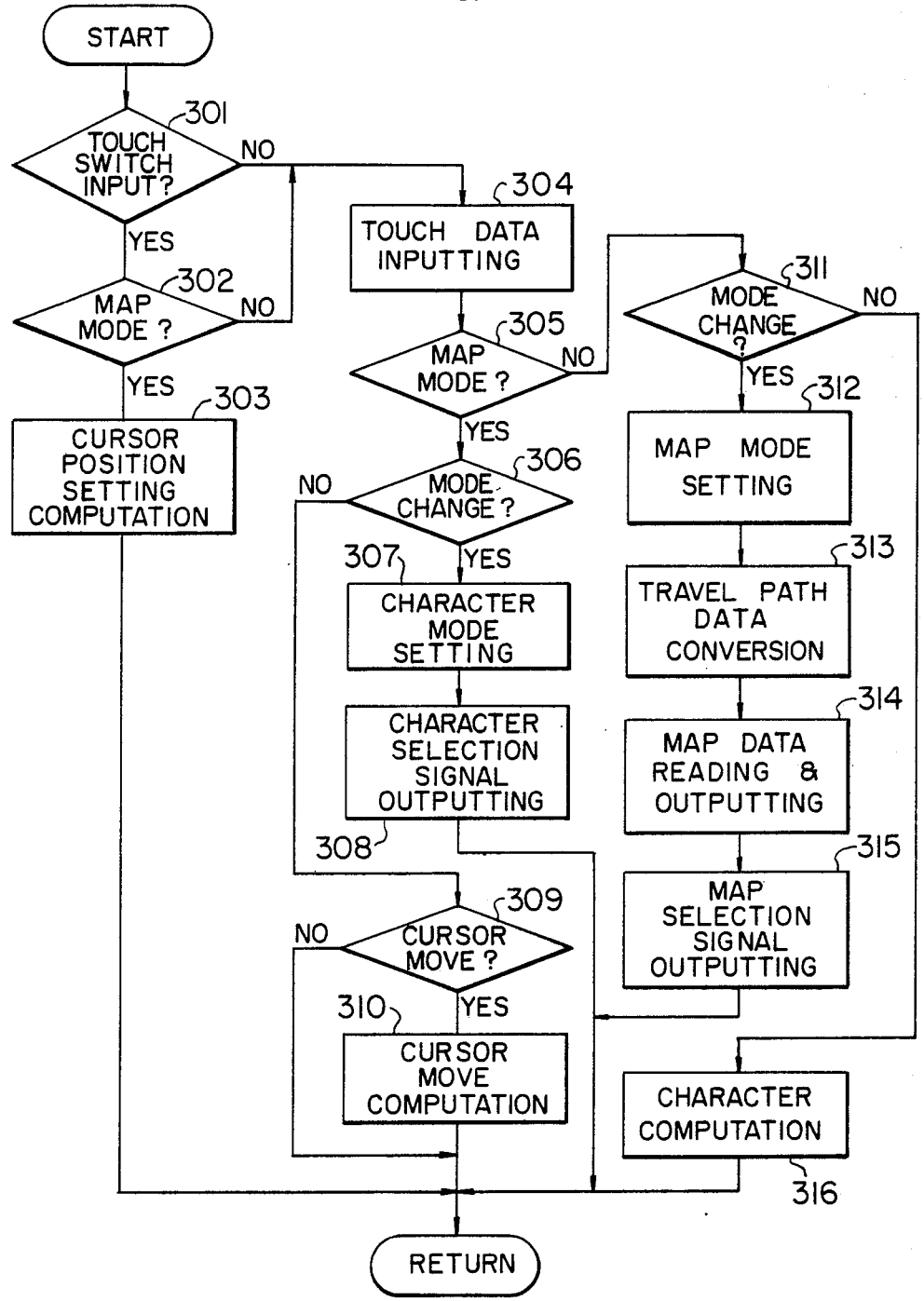
FIG. 8 is an operational flow chart showing the detailed computational operations of the mode operational routine shown in FIG. 6.
Figure 9:
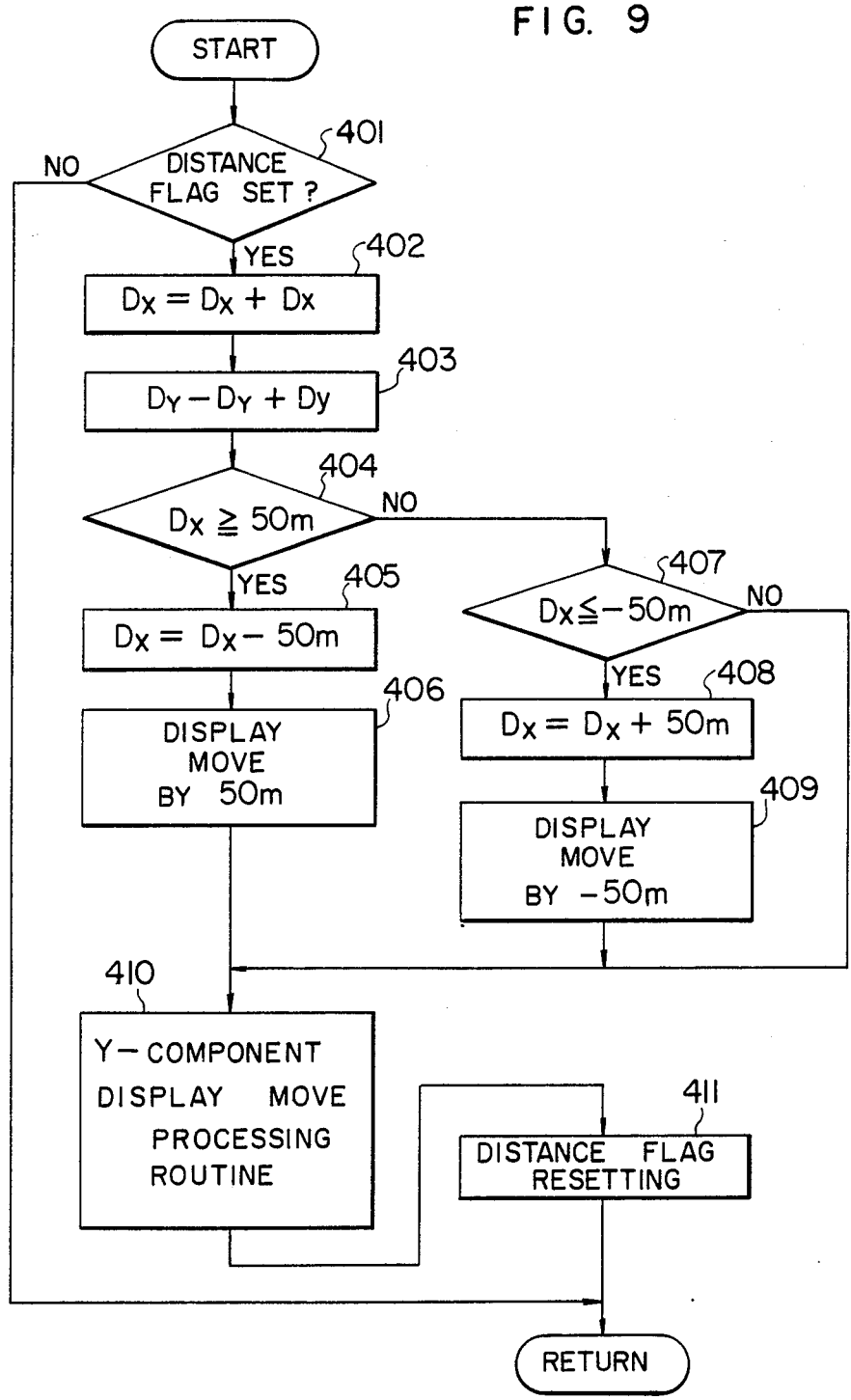
FIG. 9 is an operational flow chart showing the detailed computational operations of the present position operational routine in FIG. 6.
Figure 10:
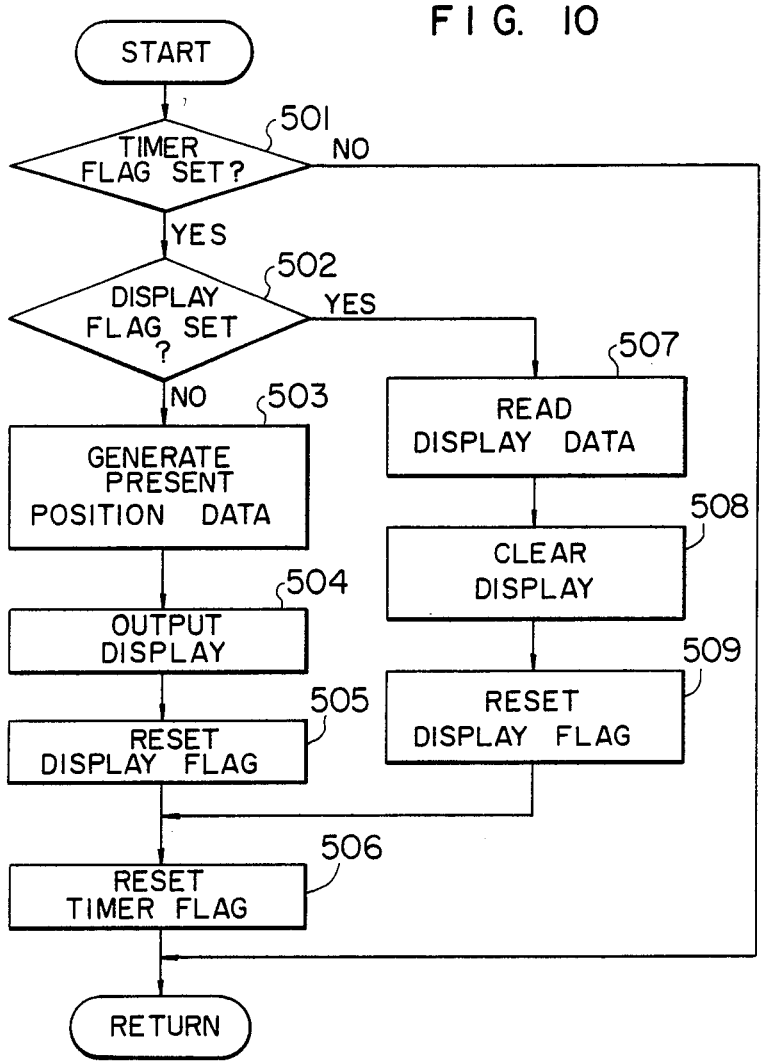
FIG. 10 is an operational flow chart showing the detailed computational operations of the cursor flashing operational routine in FIG. 6.
Figure 11:
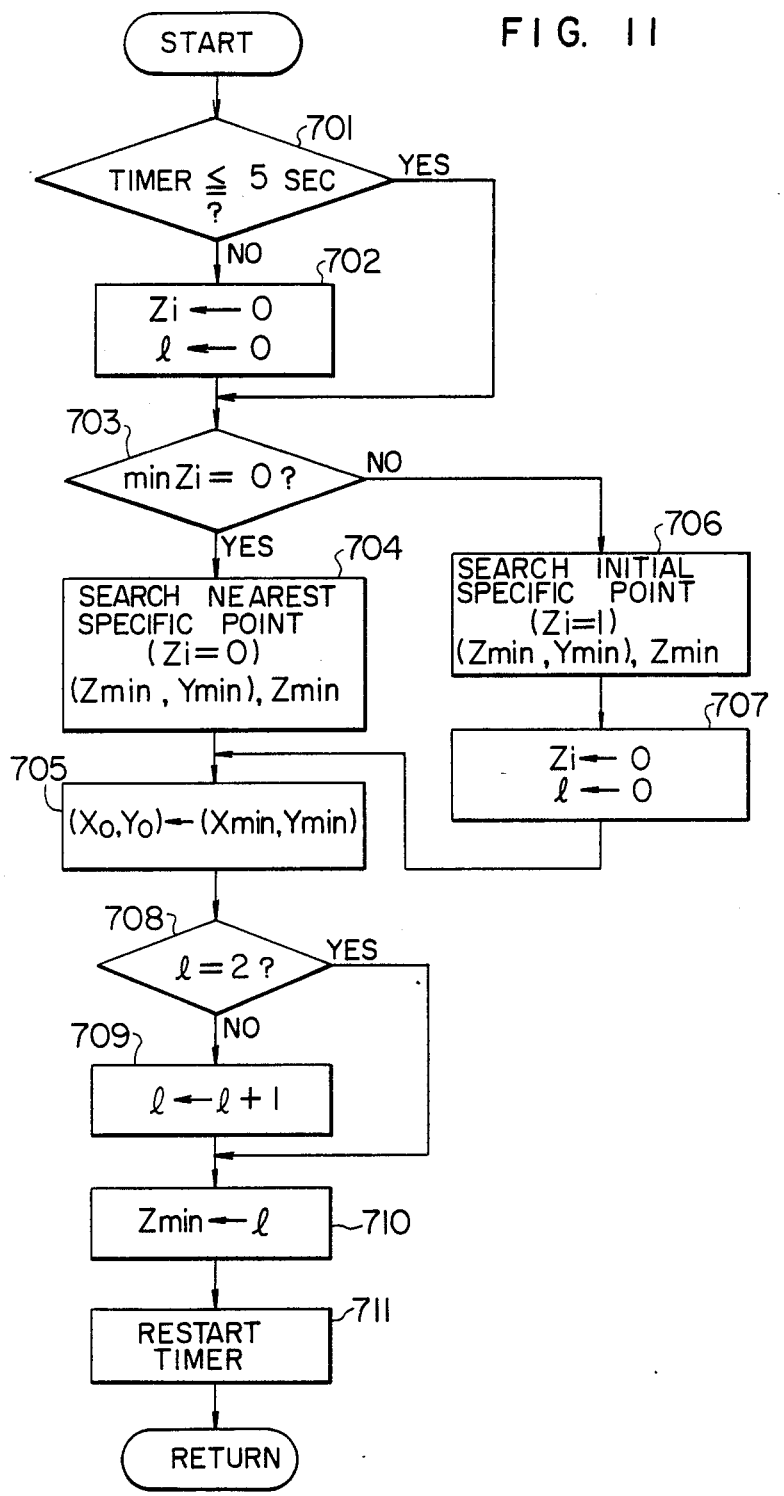
FIG. 11 is an operational flow chart showing the detailed computational operations of the cursor position setting operational routine in FIG. 8.

With the construction described above, the operation of the first embodiment will now be described with reference to the display diagrams of FIGS. 5 and 12 and the operational flow charts of FIGS. 6 to 11. FIG. 6 is an operational flow chart showing the overall computational operations of a main routine of the microcomputer 4, and FIG. 7 is an operational flow chart showing the computational operations of an interrupt operational routine executed in response to every distance pulse from the distance sensor 2. FIG. 8 is an operational flow chart showing the detailed computational operations of the mode operational routine in FIG. 6, and FIG. 9 is an operational flow chart showing the detailed computational operations of the present position operational routine in FIG. 6, and FIG. 10 is an operational flow chart showing the detailed computational operations of the cursor flashing operational routine in FIG. 6. FIG. 11 is an operational flow chart showing the detailed computational operations of the cursor position setting operational routine in FIG. 8.

Now, with a vehicle equipped with the component elements 1 to 8 shown in FIG. 1, when the key switch is closed at the start of the vehicle, the various electric units come into operation in response to the voltage supplied from the vehicle battery. Also, the microcomputer 4 comes into operation in response to the stabilized voltage of 5 volts supplied from the stabilized power supply circuit and its processing is started by a start step 100 of FIG. 6. Then, the processing proceeds to an initialization step 200 so that the registers, counters, latches, etc., in the microcomputer 4 are set to the initial states required for initiating the processing. After the completion of the initialization, the processing including from a mode operational routine 300 to a cursor flashing operational routine 500 is performed repeatedly at intervals of several tens msec.

More specifically, the mode operational routine 300 performs the operation of selecting either one of a map mode and a character mode, displaying the contents corresponding to the selected mode, enabling the movement of a present position indicative cursor in the case of the map mode and enabling the map designation of a selected section in the case of the character mode, and then it transfers to the next present position operational routine 400. The present position operational routine 400 performs the operation so that the contents of the present position data and travel track data which are to be stored in the second graphic memory 22 of the CRT controller 5 are modified for the X and Y components in accordance with a change of travel of ±50 m, and it transfers to the cursor flashing operational routine 500. The cursor flashing operational routine 500 performs the operation of changing the stored contents of the present position data in the second graphic memory 22 so as to flash the cursor at intervals of 0.6 seconds, and then it returns to the mode operational routine 300. Thereafter, the processing of the main routine including from the mode operational routine 300 to the cursor flashing operational routine 500 is performed repeatedly at intervals of about several tens msec.

While the main routine is performed repeatedly in this way, if a distance pulse is applied from the distance sensor 2 to the interrupt (INT) terminal of the microcomputer 4, the microcomputer 4 temporarily interrupts the processing of the main routine and the interrupt processing shown in FIG. 7 is executed. In other words, the processing is started by an interrupt start step 601 and then it proceeds to an integration step 602 so that the distance data D stored in the RAM 4c is updated through the integration of unit distance data (corresponding to about 39.2 cm). Then, a transfer is made to a distance decision step 603 and it is determined whether the distance data D has reached 6.25 m. If the distance data D has not reached 6.25 m, the decision becomes NO and a transfer is made to a return step 610. If the distance data D reaches 6.25 m, the decision becomes YES and a transfer is made to a heading signal input step 604. The heading signal input step 604 inputs the X- and Y-component digital signals $X_a$ and $Y_a$ (the east and north represent positive directions and the west and south represent negative directions) from the heading detecting apparatus 1 and then it transfers to an average heading computing step 605 which in turn obtains average heading data X and Y from the preceeding heading data $X_0$ and $Y_0$ (the heading data before the traveling of 6.25 m) and the current heading data $X_a$ and $Y_a$. Then, a transfer is made to a distance component computing step 606 so that an X-direction distance component $D_x$ is obtained as $6.25/X\sqrt{X^2+Y^2}$ and a Y-direction distance component $D_y$ is obtained as $6.25Y/\sqrt{X^2+Y^2}$ ($X\sqrt{X^2+Y^2}$ and $Y\sqrt{X^2+Y^2}$ respectively correspond to the $\cos\theta$ and $\sin\theta$ of a counter-clockwise angle $\theta$ as measured from the east), and a transfer is made to a storage step 607. The storage step 607 stores the current heading data $X_a$ and $Y_a$ as $X_0$ and $Y_0$ for the next computation and then transfers to a distance data reset step 608 thereby resetting the distance data D to zero. Then, a transfer is made to a distance flag set step 609 which sets a distance flag and transfers to the return step 610 thereby making a return to the main routine which was previously interrupted temporarily. In other words, this routine performs the operation of updating the distance data D by integration each time the unit distance is traveled, computing the X- and Y-direction distance components $D_x$ and $D_y$ for reaching 6.25 when the distance data D reaches 6.25 and then setting the distance flag.

Next, the detailed computational operations of the mode operational routine 300 in the main routine will be described. The processing of the mode operational routine 300 is initiated by a touch switch input decision step 301 of FIG. 8 and the state of the touch switch 8 is examined to determine whether it is turned on newly. If it is, the decision becomes YES and a transfer is made to a map mode decision step 302 so that whether the contents of the mode area in the RAM 4c show the map mode is determined. If the map mode is determined, the decision becomes YES and a transfer is made to a cursor position setting operational routine 303.

The detailed computational operations of the cursor position setting operational routine 303 are shown in FIG. 11. In the Figure, firstly a step 701 determines whether the elapsed time from the preceeding turning on of the touch switch 8 is more than 5 seconds so that if a transfer is made anew to the step 701 after the expiration of 5 seconds, its decision becomes NO and it transfers to a step 702 which sets to zero all search flags $Z_i$ stored in the RAM 4c in correspondence to the X and Y coordinates ($X_i$, $Y_i$) (in the following the suffix i denotes $i=1 \sim n$) of specific points (the number is represented by n, although it varies depending on different sections) and also sets another data l to zero. Then, a transfer is made to a step 703 which in turn determines whether the minimum value of the search flags $Z_i$ is zero. If a transfer is made to the step 703 via the step 702, its decision becomes YES since all the search flags $Z_i$ are zero and it transfers to a step 704. Of the specific points whose associated search flags are zero, the one having the minimum $\{(X_i-X_0)^2+(Y_i-Y_0)^2\}$ for the X and Y coordinates ($X_0$, $Y_0$) of the present position is determined by the step 704 so that its X and Y coordinates are set to Xmin and Ymin and also its search flag is set to Zmin. Then, a transfer is made to a step 705 so that the X and Y coordinates (Xmin, Ymin) are set as the X and Y coordinates of the present position and also the stored contents of the present position data in the second graphic memory 22 of the CRT controller 5 are modified to display the cursor at the said position. Then, a transfer is made to a step 708 which determines whether the data l is 2. However, since the step 702 has set the data l to zero as mentioned previously, the decision becomes NO and a transfer is made to a step 709 thereby setting the data l to 1. Then, a transfer is made to a step 710 which sets the Zmin to 1 and then transfers to a step 711, thereby restarting the timer and completing one cycle of the cursor position setting operational routine 303. Thus, each time the touch switch 8 is closed, the cursor is moved to one of the specific points which is nearest to its point.

In addition to the above cursor movement, when the cursor is to be moved to any one of the other specific points, the touch switch 8 is closed again so that one of the specific points nearest to the position of the cursor moved by the above-described processing of FIG. 11 is searched and the cursor is moved to the searched point. In this case, if the touch switch 8 is closed before the expiration of 5 seconds from the time of the preceeding closing of the touch switch 8, the step 709 sets the data l to 2 and thus the search flag Zmin corresponding to the searched specific point is set to 2.

If the touch switch 8 is successively operated by touching before the expiration of 5 seconds, the specific points nearest to the position of the currently displayed cursor are successively searched and the cursor is successively moved correspondingly. Also, the corresponding search flags Zmin are also successively set to 2.

After all the specific points have been searched (thus setting the search flag searched first to 1 and the other specific points to 2), if the touch switch 8 is again operated by touching, the decision of the step 703 becomes NO when the processing proceeds to it and the step 703 transfers to a step 706 thereby setting the X and Y coordinates of the search flag set to 1 to Xmin and Ymin and also setting this search flag to Zmin. Then, a transfer is made to a step 707 so that all the search flags Zi are set to 0 and the data l is set to 0, and a transfer is made to the step 705. In other words, the search flags Zi and the data l are initialized as in the case when the processing proceeds to the step 702 after the counting of 5 seconds by the timer.

Thus, in accordance with the processing shown in FIG. 11, if the touch switch 8 is successively touched before the expiration of 5 seconds, the cursor is moved in such a manner that the cursor is successively moved to the predetermined plurality of specific points and after the completion of each round the cursor makes another round beginning at the specific point to which the cursor was first moved.

On the other hand, if the decision of the switch input decision step 301 is NO or the decision of the map mode decision step 302 is NO, a transfer is made to a touch data input step 304 so that the touch data from the touch panel section 7 is inputted and stored in the RAM 4c. Then, a transfer is made to a map mode decision step 305 which determines whether the contents of the mode area in the RAM 4c show the map mode. If the map mode is determined, the decision becomes YES and a transfer is made to a mode change decision step 306 which determines whether the touch data stored in the RAM 4c is a mode change indicative data (the one resulting from the depression of the touch area 34 in FIG. 3). If the touch data is the mode change indicative data, the decision becomes YES so that a transfer is made to a character mode setting step 307 and the contents of the mode area are set to the character mode. Then, a transfer is made to a character selection signal output step 308 so that a character selection signal is applied to the video controller 26 of the CRT controller 5 so as to display a character image on the CRT display unit 6, and one cycle of the processing of the mode operational routine 300 is completed.

On the contrary, if the touch data is not the mode change indicative data, that is, if it is the one resulting from the depression of any other touch area than the touch area 34 or the one resulting from the depression of no touch area (e.g., a data called as hexadecimal FF), the decision of the mode change decision step 306 becomes NO and a transfer is made to a cursor move decision step 309. The cursor move decision step 309 determines whether the touch data is the one (cursor move data) resulting from the depression of any one of the touch areas 32, 33, 35, 38, 40 and 41 so that if the touch data is not the cursor move data, the decision becomes NO and one cycle of the mode operational routine 300 is completed. If the touch data is the cursor move data, the decision becomes YES and a transfer is made to a cursor move computation step 310. If the touch data is the one resulting from the depression of the touch area 32 or 33, the cursor move computation step 310 performs a computational operation to modify the stored contents of the present position data in the second graphic memory 22 of the CRT controller 5 (the present position on the display screen is stored in the form of X and Y coordinates with respect to the display screen in the RAM 4c and the X- and Y-coordinate data are also modified) so as to move the present position cursor displayed on the CRT display unit 6 toward the north a predetermined distance. In the like manner, the necessary operation is performed and the stored contents of the present position data in the second graphic memory 22 are modified in such a manner that the cursor is similarly moved toward the west if the touch data is the one resulting from the depression of the touch area 35, the cursor is similarly moved toward the south if the touch data is the one resulting from the depression of the touch area 40 or 41 or the cursor is similarly moved toward the east if the touch data is the one resulting from the depression of the touch area 38, and one cycle of the processing of the mode operational routine 300 is completed.

On the other hand, if the decision of the map mode decision step 305 is NO, a transfer is made to a mode change decision step 311 which determines whether a mode change is commanded through the same operation as the mode change decision step 306. If a mode change is commanded so that the decision becomes YES, a transfer is made to a map mode setting step 312 and the contents of the mode area in the RAM 4c are set to the map mode. Then, a transfer is made to a data conversion step 313 and the travel path data in the second graphic memory 22 of the CRT controller 5 is converted. In this case, the reader 3 is controlled so that a selected section is searched in accordance with its map number, the necessary coordinate conversion values are computed from the absolute coordinate data of the searched map (stored in the header portion A shown in FIG. 4) and the absolute coordinate data of the map of the preceeding section, and then the travel track data in the second graphic memory 22 is converted in accordance with the computed values to cause it to slide, and also the X and Y coordinate data in the RAM 4c are converted in the like manner. Then, a transfer is made to a map data read and output step 314 so that the map data and the relative coordinate data of specific points on the cassette tape 3a are inputted through the reader 3 and the map data is delivered to the first graphic memory 21. Then, a transfer is made to a map selection signal output step 315 so that a map selection signal for displaying a graphic image of the map on the CRT display unit 6 is applied to the video controller 26, and one cycle of the mode operational routine 300 is completed. In other words, when the character image is to be changed to the graphic image of a map which is different from the preceeding one, the above-mentioned operations are performed so that the current map data is stored in the first graphic memory 21 and also the stored contents of the second graphic memory 22 are converted so as to adjust the travel track and the present position indicative cursor to the present position corresponding to the map. In this way, even if the map displayed on the CRT display unit 6 is replaced with another map, the travel track and the present position can be displayed on the corresponding portions of the newly displayed map.

Figure 12:
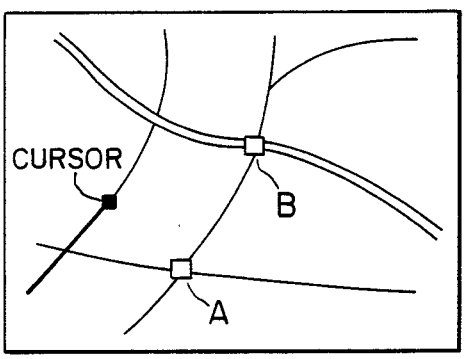

Also, the map data is arranged so that the map corresponding to the map data is displayed on the CRT display unit 6 and square specific point marks designated by symbols A and B are displayed at the positions corresponding to the specific points as shown in FIG. 12.

On the other hand, if the decision of the mode change decision step 311 is NO, the step 311 transfers to a character computation step 316. When a transfer is made to the character computation step 316, it indicates a condition where the character mode has been set and the character selection signal has been applied to the video controller 26 and thus the CRT display unit 6 is displaying a character image such as shown in FIG. 5. The figures 02-4-68 indicated in the central portion of this character image respectively designate a district, division and section and the character computation step 316 performs the computational operations so that each of the figures is updated by increasing it by 1 at a time through an increment switch 51, updated by decreasing it by 1 at a time through a decrement switch 52, set by a set switch 53 and reset by a reset switch 54. The data of the district, division and section figures or the map number is stored in the RAM 4c. Also, the switches 51, 52, 53 and 54 respectively correspond to the touch areas 39, 40, 41 and 42 in FIG. 3.

More specifically, the mode operational routine 300 shown in FIG. 8 performs the following operations 1 to 5 in accordance with the touch switch input indicative of the states of the touch switch 8, the touch data from the touch panel section 7 and the contents of the mode area in the RAM 4c.

1 In the map mode, if the touch switch 8 is turned on anew, the cursor is moved to the nearest specific point.

2 In the map mode with no mode change command, if there is a cursor move command from the touch panel section 7, the cursor is moved in any one of the vertical and lateral directions.

3 If a mode change command is generated in the map mode, the map mode is changed to the character mode and a character image is displayed on the CRT display unit 6.

Figure 5:
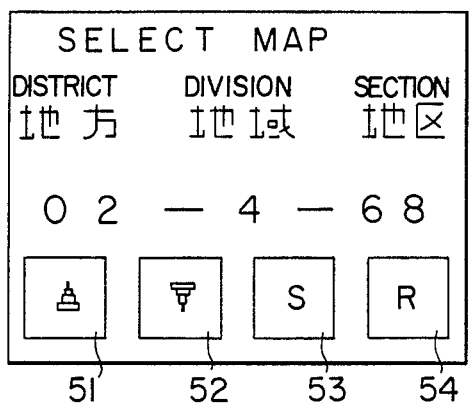
FIGS. 5 and 12 are diagrams showing exemplary displays on a CRT display unit.

4 In the character mode with no mode change command, a change of the map is acceptable to the character image such as shown in FIG. 5.

5 If a mode change command is generated in the character mode, the character mode is changed to the map mode and a map graphic image is displayed on the CRT display unit 6 while adjusting and displaying the travel track and the present position.

Next, the detailed computational operations of the present position operational routine 400 in the main routine will be described. With the present position operational routine 400, its processing is started by a distance flag decision step 401 of FIG. 9 and the interrupt processing of FIG. 7 determines whether the distance flag is set. If the distance is not set, the decision becomes NO and one cycle of the processing of the present position operational routine 400 is completed. If the distance flag is set, the decision becomes YES and a transfer is made to an X-distance correction step 402. The X-distance correction step 402 performs a correction operation (DX=DX+Dx) on an X-distance data DX in accordance with the X-distance component Dx obtained by the interrupt processing, and a Y-distance correction step 403 simultaneously performs a correction operation (DY=DY+Dy) on a Y-distance data DY. Then, a transfer is made to a first X-distance decision step 404 which determines whether the value of the X-distance data D is greater than 50 m. If the value of the X-distance data D is greater than 50 m, its decision becomes YES and it transfers to an X-distance subtraction step 405 which in turn subtracts a value of 50 m from the X-distance data DX and transfers to a display move step 406. As a result, the X and Y coordinate data stored in the RAM 4c are changed by 50 m in the positive direction (toward the east) and also the travel track data in the second graphic memory 22 is moved correspondingly.

If the decision of the first X-distance decision step 404 is NO, it transfers to a second X-distance decision step 407 which determines whether the value of the X-distance data DX is less than −50 m. If the value of the X-distance data DX is less than −50 m, the decision becomes YES and a transfer is made to an X-distance addition step 408 which in turn adds a value of 50 m to the X-distance data DX. Then, a transfer is made to a display move step 409 so that the X and Y coordinate data stored in the RAM 4c are changed by 50 m in the negative direction (toward the west) and the travel track data in the second graphic memory 22 is moved correspondingly.

If the decision of the second X-distance decision step 407 is NO or after the display move step 406 or 409, a transfer is made to a Y-component display move processing routine 410 so that the same decision and computational operations as the steps 404 through 409 are performed on the Y-distance data DY computed by the Y-distance correction step 403. (When the Y-distance data DY attains a value of greater than 50 m in either one of the positive and negative directions, the X- and Y-coordinate data in the RAM 4c and the travel track data in the second graphic memory 22 are moved correspondingly.) Then, a transfer is made to the next distance flag reset step 411 and the distance flag is reset.

In other words, in accordance with the present position operational routine 400 shown in FIG. 9, the X- and Y-coordinate data in the RAM 4c and the travel track data in the second graphic memory 22 are converted irrespective of the image displayed on the CRT display unit 6.

Next, the detailed computational operations of the cursor flashing operational routine 500 will be described. With regard to the cursor flashing operational routine 500, its processing is started by a timer flag decision step 501 of FIG. 10 which determines whether a timer flag adapted to be set at intervals of 0.6 seconds by an internal timer is set. If the timer flag is not set, the decision becomes NO and one cycle of the processing of the cursor flashing operational routine 500 is completed. If the timer flag is set, the decision becomes YES and a transfer is made to a display flag decision step 502 which determines whether a display flag indicative of the display of the present position is set. If the display flag is reset, the decision becomes NO and a transfer is made to a present position data generation step 503 which in turn generates a present position data from the X- and Y-coordinate data stored in the RAM 4c (i.e., the corresponding X- and Y-coordinate data and a total of 9 surrounding present position displaying data are generated). Then, a transfer is made to a display output step 504 so that a display data for the generated present position data excluding the travel track data already stored in the second graphic memory 22 is generated by referring to the contents of the latter and the data for displaying the cursor excluding the travel track is delivered to and stored in the second graphic memory 22. Then, a transfer is made to a display flag set step 505 and the display flag is set. Then, a transfer is made to a timer flag reset step 506 and the timer flag is reset, thus completing one cycle of the processing of the cursor flashing operational routine 500.

Note that there are cases where the previously generated display data may be stored in the RAM 4c so that the display data is converted in accordance with the operation of the previously mentioned cursor move operation (the step 310) or the display move operation (the steps 406, 409, etc.). (In this case, the display data is first read from the RAM 4c so that the display data which deserves to be erased with respect to the move is selected and the stored data of the second graphic memory 22 corresponding to this display data and the selected display data are cleared. Then, the data to be newly subjected to the display movement in accordance with the updated present position data X and Y is read from the second graphic memory 22 so that in accordance with this data the display data corresponding to that excluding the travel track is generated and stored in the RAM 4c. Also, the data corresponding to the display data is delivered to and stored in the second graphic memory 22.)

On the other hand, if the decision of the display flag decision step 502 is YES, a transfer is made to a display data read step 507 which reads the display data stored in the RAM 4c and transfers to a display clear step 508. Thus, the data causing the display of the cursor portion excluding the travel track is cleared from the contents of the second graphic memory 22 in accordance with the read display data and a transfer is made to a display flag reset step 509 which in turn resets the display flag and transfers to the timer flag reset step 506.

In other words, the cursor flashing operational routine 500 is responsive to the timer flag which is set at intervals of 0.6 seconds by the internal timer, so that if the display flag is set, the required present position data is generated and also the necessary display data excluding the travel track data is generated in reference to the stored contents of the second graphic memory 22 thereby storing in the second graphic memory 22 the data required for displaying the cursor portion excluding the travel track. If the display flag is reset, the data causing the display of the cursor portion excluding the travel track is cleared from the contents of the second graphic memory 22 in accordance with the display data read from the RAM 4c.

Thus, the cursor (comprising nine picture elements) indicating the present position is flashed on and off at intervals of 0.6 seconds on the CRT display unit 6.

Thus, in accordance with the repeated processing of the main routine including from the mode operational routine 300 to the cursor flashing operational routine 500 and the interrupt processing of FIG. 7, the present position data and the travel track data in the second graphic memory 22 are successively modified and also the image on the CRT display unit 6 is changed in accordance with the selected mode such that a map graphic image (including the display of a present position and a travel track) is displayed in the case of the map mode and a map selecting character image as shown in FIG. 5 is displayed in the case of the character mode.

While, in the above-described first embodiment, the cassette tape 3a is used as memory means, it is possible to use a floppy disk or semiconductor memory storing the necessary map data.

Further, while the CRT display unit 6 is used as display means, it is possible to use a liquid crystal display unit, plasma display unit, EL display unit or the like.

Further, while the touch panel section 7 and the touch switch 8 are respectively used as first and second position setting means, there is no need to use separate hardware for each of them. For instance, the second position setting means may be comprised of the upper left portion of the touch panel section 7 (the touch area 31 in FIG. 3). The first position setting means may be comprised of four switches for moving the cursor vertically and laterally.

Further, while, in the first embodiment, the specific points are preliminarily stored in the cassette tape 3a, it is possible to use such coordinate inputting means as a ten-key switch so that the driver can input the absolute coordinate data of his own house, etc., thereby setting the desired specific points.

Further, while the first position setting means comprises the touch panel section 7 for moving the cursor vertically and laterally, it is possible to use means which moves the cursor not only in the vertical and lateral directions but also in any desired angular direction. In addition to the commanding of cursor movement by means of the touch panel section 7 and the touch switch 8, it is possible to detect a cursor move command given by the driver's voice and move the cursor.

Still further, while the specific points on a map are displayed in the form of square displays as shown in FIG. 12, it is possible to show the specific points by changing the color of the corresponding portions.

Still further, while the present position is determined in accordance with the signals from the heading detecting apparatus 1 and the distance sensor 2, the desired present position data may be obtained by receiving the signals from transmitters or the like which are positioned for example at the major intersections or the like.

Still further, as regards the movement of the cursor by the touch panel section 7 and the touch switch 8, it is possible to provide a disable switch so that when the switch is closed, the movement of the cursor is disabled to prevent the cursor movement due to any erroneous operation.

Figure 13:
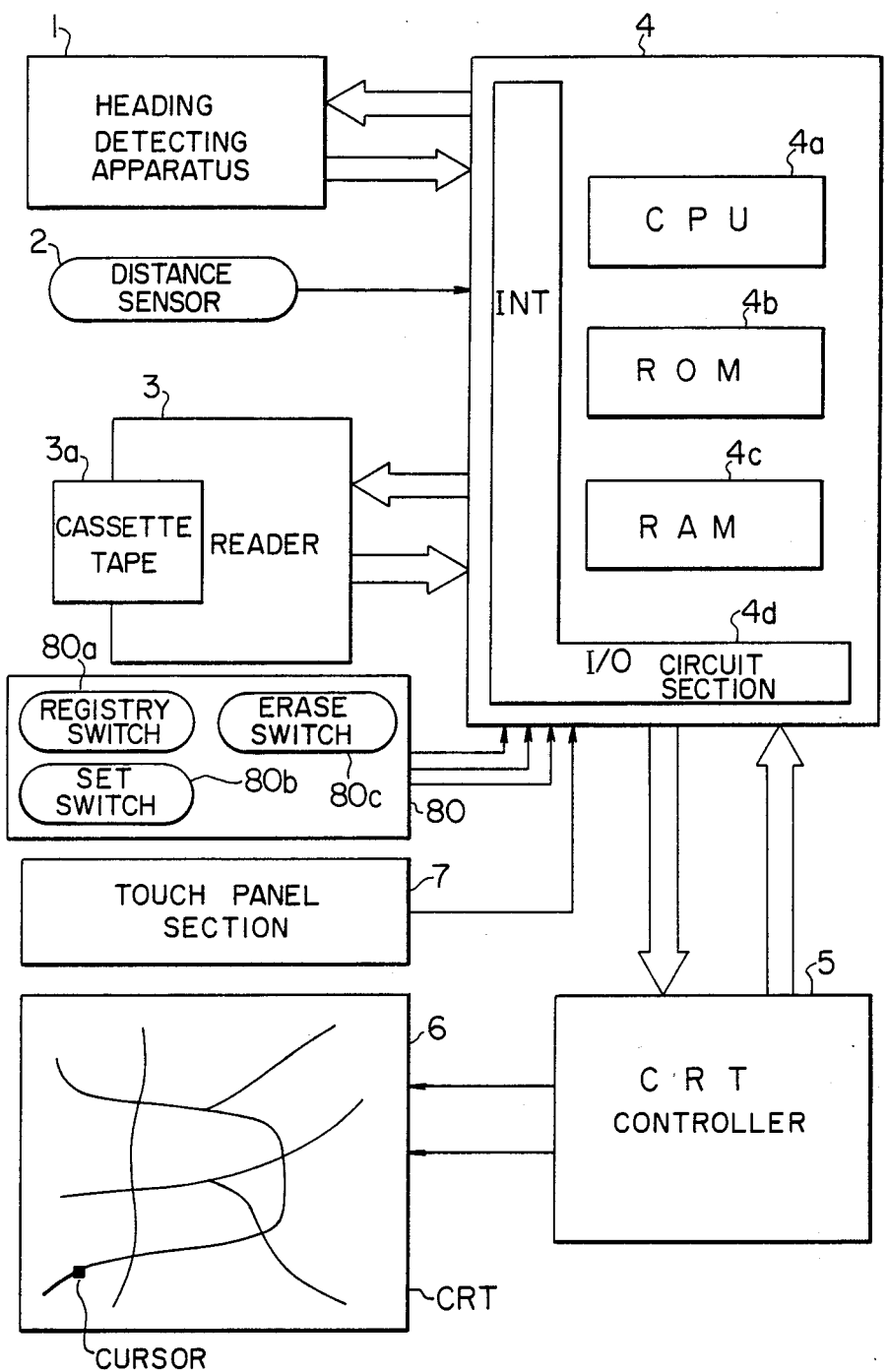
FIG. 13 is a block diagram showing the overall construction of a second embodiment of the invention.

A second embodiment of the invention will now be described. FIG. 13 is a block diagram showing the overall construction of the second embodiment. In the Figure, the same reference numerals as used in FIG. 1 designate the same component parts. Numeral 80 designates a switch section comprising a push-lock type registry switch 80a for generating a registry command during the time it is closed, a reset type set switch 80b for generating a timing of registry or reading setting and a reset type erase switch 80c for travel track erasing purposes. The registry switch 8a and the set switch 8b form commanding means. The microcomputer 4 and the CRT controller 5 form control means.

Figure 14:
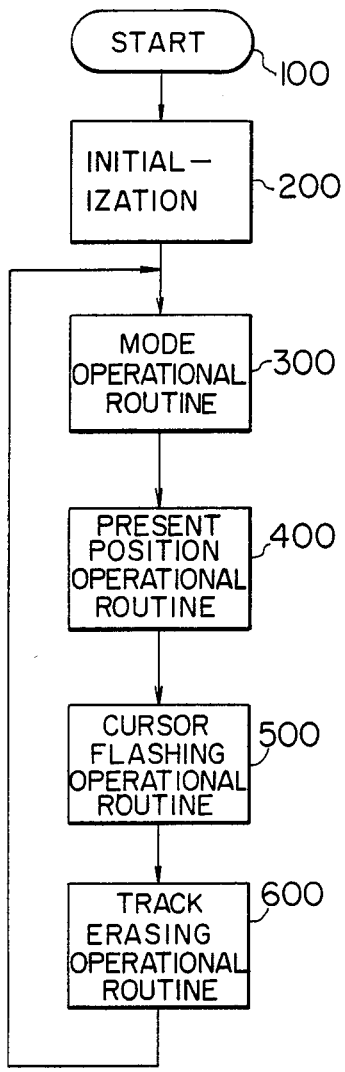
FIG. 14 is an operational flow chart showing the detailed computational operations of a main routine of a microcomputer.
Figure 16:
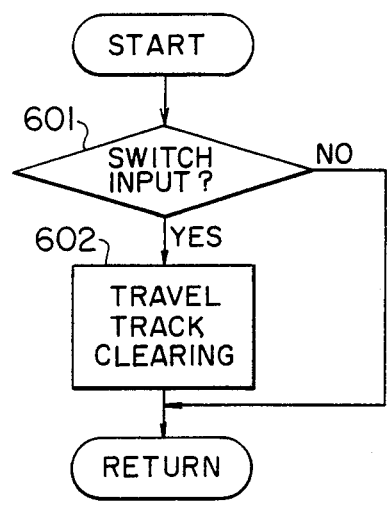
FIG. 16 is an operational flow chart showing the detailed computational operations of the track erasing operational routine in FIG. 14.
Figure 15:
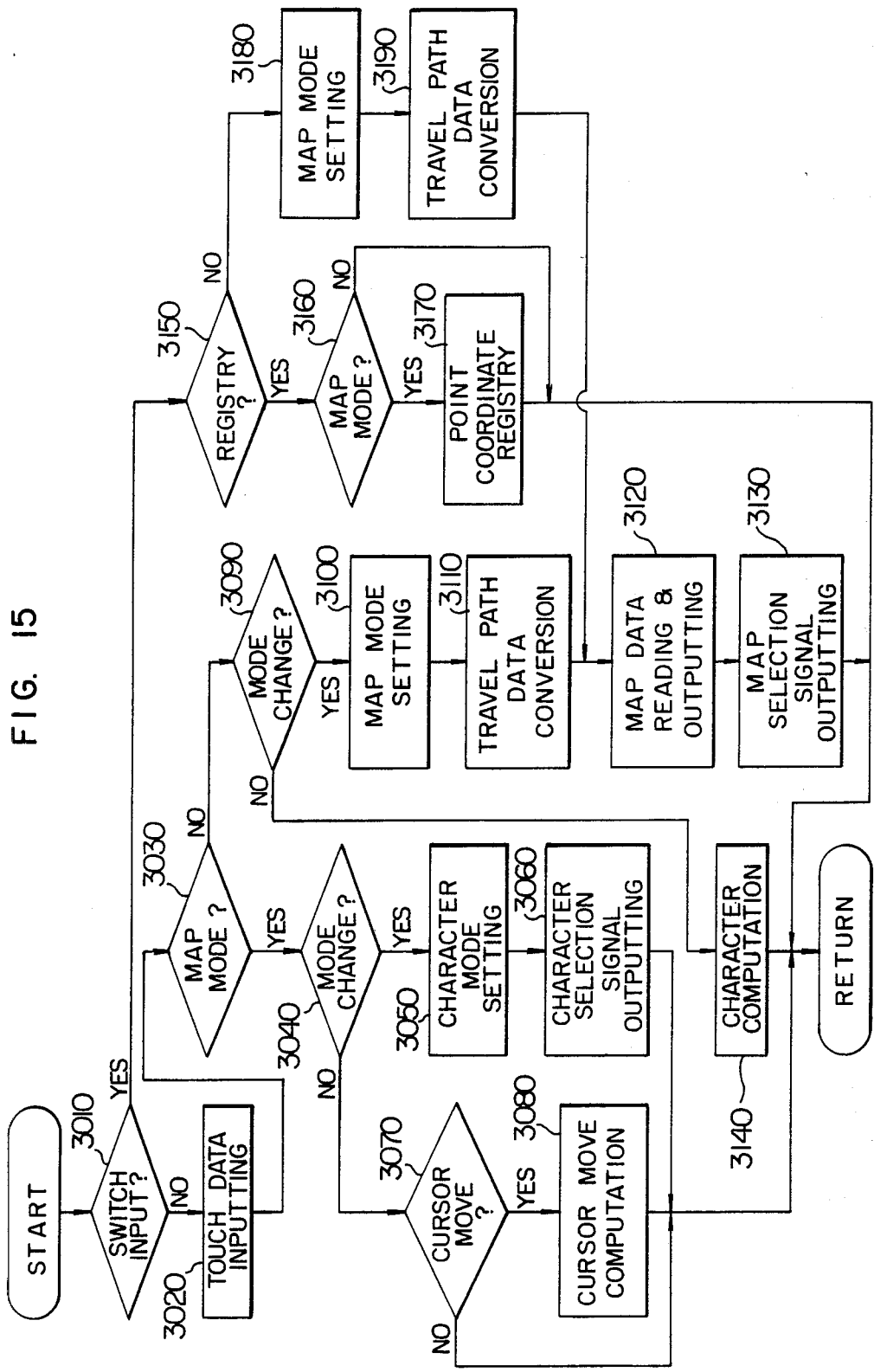
FIG. 15 is an operational flow chart showing the detailed computational operations of the mode operational routine in FIG. 14.

With the construction described above, the operation of the second embodiment will now be described with reference to the operational flow charts shown in FIGS. 14 through 16. FIG. 14 is an operational flow chart showing the overall computational operations of a main routine of the microcomputer 4, and FIG. 15 is an operational flow chart showing the overall computational operations of the mode operational routine in FIG. 14. FIG. 16 is an operational flow chart showing the detailed computational operations of the track erasing operational routine in FIG. 14.

Now, with the vehicle equipped with the component parts 1 to 8 shown in FIG. 13, when the key switch is closed at the start of its operation, the various electric units come into operation in response to the application of the voltage from the battery of the vehicle. Then, the microcomputer 4 comes into operation in response to the application of the stabilized voltage of 5 volts from the stabilized power supply circuit and its processing is initiated by a start step 100 of FIG. 14. Then, a transfer is made to an initialization routine 200 so that the registers, counters, latches, etc., in the microcomputer 4 are set to the initial states required for initiating the processing. After the completion of the initialization, the processing of the main routine including from a mode operational routine 300 to a track erasing operational routine 600 is executed repeatedly at intervals of about several tens msec.

Thus, the mode operational routine 300 performs the operation so that either one of map and character modes is selected and the contents corresponding to the selected mode are displayed on the CRT. If the map mode is selected, the movement of the present position indicative cursor is enabled. In the case of the character mode the operation for enabling the selection of a map of a specified section is performed and a transfer is made to the next present position operational routine 400. The routine 400 performs the necessary operation so that the contents of present position data and travel track data to be stored in the second graphic memory 22 of the CRT controller 5 are modified with respect to the X- and Y-components for every change of travel of 50 m and then it transfers to the next cursor flashing operational routine 500. In accordance with the cursor flashing operational routine 500, the operation of changing the stored contents of the present position data in the second graphic memory 22 is performed so as to flash the cursor on and off at intervals of 0.6 seconds and then a transfer is made to the track erasing operational routine 600. The track erasing operational routine 600 performs the operation of erasing the travel track in accordance with the state of the erase switch 80c and then it returns to the mode operational routine 400. Thereafter, the processing of the main routine including from the mode operational routine 300 to the track erasing operational routine 600 is performed repeatedly at intervals of several tens m sec.

Next, the detailed computational operations of the mode operational routine 300 in the main routine will be described. The processing of the mode operational routine 300 is initiated by a switch input decision step 3010 of FIG. 15 and the step 3010 determines whether the set switch 80b in the switch section 80 is turned on anew. If it is not turned on anew, the decision becomes NO and a transfer is made to a touch data input step 3020 so that the touch data from the touch panel section 7 is inputted and stored in the RAM 4c. Then, a transfer is made to a map mode decision step 3030 which determines whether the contents of the mode area in the RAM 4c represent the map mode. In the case of the map mode, the decision becomes YES and a transfer is made to a mode change decision step 3040 which determines whether the touch data stored in the RAM 4c is the mode change indicative data (the data resulting from the depression of the touch area 34 in FIG. 3). If the touch data is the mode change indicative data, the decision becomes YES so that a transfer is made to a character mode setting step 3050 and the contents of the mode area are set to the character mode. Then, a transfer is made to a character selection signal output step 3060 and thus a character selection signal for displaying a character image on the CRT display unit 6 is applied to the video controller 26 of the CRT controller 5, and one cycle of the processing of the mode operational routine 300 is completed.

On the other hand, if the touch data is not the mode change indicative data, that is, if the touch data is the data resulting from the depression of any other touch area than the touch area 34 in FIG. 3 or the data (e.g., a data called as FF) obtained when none of the touch areas is depressed, the decision of the mode change decision step 3040 becomes NO and a transfer is made to a cursor move decision step 3070. The cursor move decision step 3070 determines whether the touch data is the one (the cursor move data) resulting from the depression of any one of the touch areas 32, 33, 35, 38, 40 and 41, so that if the touch data is not the cursor move data, the decision becomes NO and one cycle of the mode operational routine 300 is completed. If the touch data is the cursor move data, the decision becomes YES and a transfer is made to a cursor move computation step 3080. The step 3080 performs the operation in response to the touch data so that if the touch data is the one resulting from the depression of the touch area 32 or 33, the stored contents of the present position data in the second graphic memory 22 of the CRT controller 5 are modified (the present position on the display screen is stored as the X and Y coordinates with respect to the display screen in the RAM 4c and the values of the X- and Y-coordinate data are modified) so as to move the cursor displayed on the CRT display unit 6 toward the north a predetermined distance. In the like manner, the step 3080 performs the operation to modify the stored contents of the present position data in the second graphic memory 22 in such a manner that the cursor is similarly moved toward the west if the touch data is the one resulting from the depression of the touch area 35, the cursor is similarly moved toward the south if the touch data is the one resulting from the depression of the touch area 40 or 41 or the cursor is similarly moved toward the east if the touch data is the one resulting from the depressing of the touch area 38, and one cycle of the mode operational routine 300 is completed.

On the other hand, if the decision of the map mode decision step 3030 is NO, a transfer is made to a mode change decision step 3090 which determines whether there is a mode change command through the same operation as the mode change decision step 3040. If there is a mode change command so that the decision becomes YES, a transfer is made to a map mode setting step 3100 so that the contents of the mode area in the RAM 4c are set to the map mode and a transfer is made to a travel path data conversion step 3110 thereby converting the travel path data in the second graphic memory 22 of the CRT controller 5. In this case, the reader 3 is first controlled so that a selected section is searched in accordance with its map number and the necessary coordinate conversion values are computed in accordance with the absolute coordinate data of the map of the searched section (stored in the header portion A shown in FIG. 4) and the absolute coordinate data of the map of the preceeding section. Then, in accordance with the computed values the travel track data in the second graphic memory 22 is converted so as to slide and the X- and Y-coordinate data in the RAM 4c are also converted in the like manner. Then, a transfer is made to a map data read and output step 3120 so that the map data of the cassette tape 3a is inputted through the reader 3 and the map data is supplied to the first graphic memory 21. Then, a transfer is made to a map selection signal output step 3130 so that a map selection signal for displaying a graphic image of the map on the CRT display unit 6 is applied to the video controller 26, and one cycle of the processing of the mode operational routine 300 is completed. In other words, where the character image is to be changed to the graphic image of a map which is different from the preceeding one, the above-mentioned operations are performed so that the current map data is stored in the first graphic memory 21 and the stored contents of the second graphic memory 22 are converted so as to adjust the travel track and the present position indicative cursor to the present position corresponding to the map. In this way, even if the map displayed on the CRT display unit 6 is replaced with a new one, the travel track and the present position can be displayed on the corresponding portions of the new map.

Also, if the decision of the mode change decision step 3090 is NO, a transfer is made to a character computation step 3140. The transfer to the character computation step 3140 is an indication that the character mode has been established and the character selection signal has been delivered to the video controller 26 and consequently the CRT display unit 6 is displaying a character image such as that shown in FIG. 5. In the central portion of this character image the FIGS. 02, 4 and 68 respectively designate a district, division and section and the character computation step 3140 performs the operation so that each of the figures is updated by increasing it by 1 at a time through the increment switch 51, updated by decreasing it by 1 at a time through the decrement switch 52, set by the set switch 53 and reset by the reset switch 54. The data of these district, division and section figures or the map number is stored in the RAM 4c. The switches 51, 52, 53 and 54 respectively correspond to the touch areas 39, 40, 41 and 42.

On the other hand, if the set switch 80b is turned on anew so that the decision of the switch input decision step 3010 becomes YES, a transfer is made to a registry decision step 3150 so that if there is a registry command from the registry switch 80a (the registry state), its decision becomes YES and it transfers to a map mode decision step 3160. As a result, whether there is the map mode is determined in the same manner as the previously mentioned map mode decision step 3030. If there is the map mode so that the decision becomes YES, a transfer is made to a point coordinate registry step 3170 so that (by this time the cursor must have been set to a point to be registered) the map number and the X and Y coordinates of the present invention stored in the RAM 4c are stored in the registry area of the RAM 4c (i.e., the previous registry stored contents are updated), and one cycle of the processing of the mode operational routine 300 is completed.

If the decision of the map mode decision step 3160 is NO, the step 3160 does not transfer to the point coordinate registry step 3170 and one cycle of the mode operational routine 300 is completed.

On the other hand, if the decision of the registry decision step 3150 is NO, that is, if there is no registry command from the registry switch 80a (the read state), a transfer is made to a map mode setting step 3180 so that the contents of the mode area in the RAM 4c are set to the map mode (in some cases the contents have already been set to the map mode), and then a transfer is made to a travel path data conversion step 3190 thereby converting the travel path data in the second graphic memory 22 of the CRT controller 5. In this case, in accordance with the map number stored in the registry area of the RAM 4c the reader 3 is controlled to search the corresponding map so that in accordance with the same operation as the travel path data conversion step 3110 the travel track data in the second graphic memory 22 is converted to slide and also the data indicative of the present position is changed to the X and Y coordinate values stored in the registry area of the RAM 4c, thereby making a transfer to a map data read and output step 3120. In other words, the present position is moved to the specific point position on the map which has already been registered.

Thus, in accordance with the mode operational routine 300 shown in FIG. 15 the following operations 1 to 6 are performed in accordance with the switch input indicative of the states of the switch section 80, the touch data from the touch panel section 7 and the contents of the mode area in the RAM 4c.

1  In the map mode with a registry command, if the set switch 80b is turned on, the displayed map number and the cursor point coordinates are registered in the RAM 4c. (The cursor is preliminarily set to a specific point to be registered, such as, the driver's own house prior to the closing of the set switch 80b.)

2  In the read state, if the set switch 80b is turned on, the map registered in the RAM 4c is displayed and the cursor is moved to the position of the registered specific point.

3  In the map mode with no mode change command, if a cursor move command is generated, the cursor is moved.

4  In the map mode, if a mode change command is generated, the map mode is changed to the character mode and also a character image is displayed on the CRT display unit.

5  In the character mode with no mode change command, a change of the map is acceptable with respect to character image such as shown in FIG. 5.

6  In the character mode, if a mode change command is generated, the character mode is changed to the map mode and a graphic image of the map is displayed on the CRT display unit while adjusting and displaying the travel track and the present position.

The detailed processing steps of the track erasing operational routine 600 will now be described. The processing of the track erasing operational routine 600 is initiated by a switch input decision step 601 of FIG. 16 which determines whether the erase switch 80c is on. If it is not, the decision becomes NO and one cycle of the processing of the track erasing operational routine 600 is completed. If the erase switch 80c is on so that the decision becomes YES, a transfer is made to a travel track clear step 602 and the travel track data stored in the second graphic memory 22 is cleared, thereby completing one cycle of the processing of the track erasing operational routine 600.

As a result, in accordance with the repeated execution of the main routine including from the mode operational routine 300 to the track erasing operational routine 600 and the interrupt processing of FIG. 7 the present position data and the travel track data in the second graphic memory 22 are successively modified and the image on the CRT display unit 6 is changed in accordance with the selected mode. Thus, a graphic image of the map (including the display of the present position and the travel track) is displayed on the CRT display unit 6 in the map mode and a map selection character image such as shown in FIG. 5 is displayed in the character mode. Also, in accordance with the operating conditions of the registry switch 8a and the set switch 8b the coordinates of a specific point (set by the cursor) and the map number are stored in the registry state and the cursor is moved to the registered specific point in the read state.

Next, a third embodiment of the invention which is the same with the above-described second embodiment except that a part of the mode operational routine 300 of FIG. 15 is changed, will be described with reference to the operational flow chart of FIG. 17.

Figure 17:
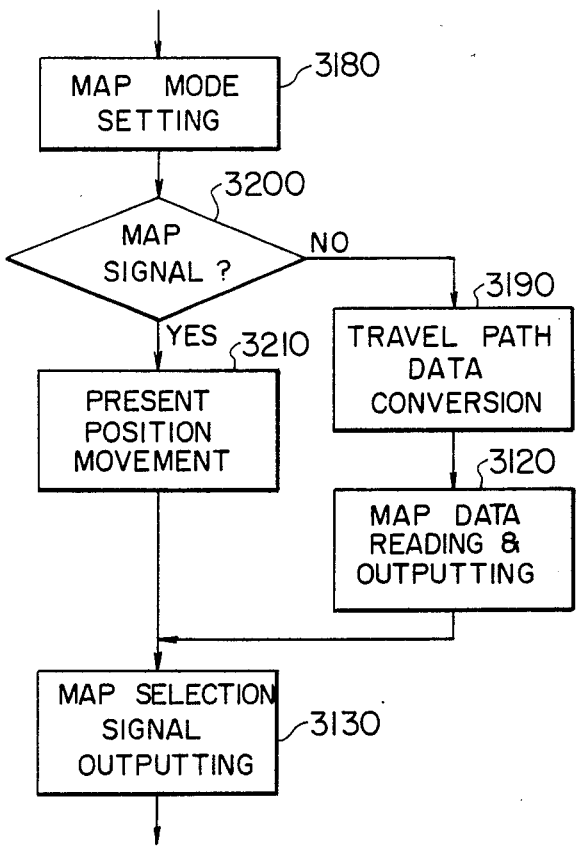
FIG. 17 is a principal operational flow chart showing a third embodiment of the invention.

FIG. 17 differs from FIG. 15 in that the processing intermediary between the map mode setting step 3180 to the map selection signal output step 3130 is changed, and the map mode setting step 3180 transfers to a map number decision step 3200 which determines whether the map number stored in the registry area of the RAM 4c is the same with the map number stored in the RAM 4c in correspondence to the map data stored in the first graphic memory 21. If it is, the decision becomes YES and a transfer is made to a present position move step 3210 so that the map is not changed but the X- and Y-coordinate values indicating the present position and stored in the RAM 4c are changed to the X- and Y-coordinate values stored in the registry area of the RAM 4c. Then, a transfer is made to the map selection signal output step 3130.

On the contrary, if the decision of the map number decision step 3200 is NO, a transfer is made to the map selection signal output step 3130 through the travel path data conversion step 3190 and the map data read and output step 3120 in the like manner as the processing of the second embodiment.

In other words, when the ON condition of the registry switch 80a is released and then the set switch 80b is turned on, if the map corresponding to the map number stored in the registry area of the RAM 4c is stored in the first graphic memory 21, the reader 3 is controlled so as to prevent the reading of any map data anew.

Further, while, in the above-described embodiments, the single set switch 80b is used, it is possible to use a plurality of such switches so as to register and read a plurality of points.

Still further, while, in the above-described embodiments, the point coordinates to be registered are inputted in the form of the position of the present position indicative cursor, a ten-key switch may be provided to input such point coordinates in the form of figures.

Still further, while the heading of a vehicle is detected by detecting the magnetic field of the earth, it is possible to detect the heading of the vehicle by detecting the direction of the vehicle relative to a reference direction.

We claim:

1. A navigator for vehicles comprising:

distance detector means for detecting a running distance of the vehicle to generate a distance signal;

direction detector means for detecting a travelling direction of the vehicle to generate a direction signal;

memory means for storing map data for displaying the road map of a travelling region of the vehicle and position information of a specific point of the travelling region;

display means for electronically displaying the road map and a cursor for indicating the present position of the vehicle on a display surface thereof;

first command means for generating a first command for causing said cursor to move in a predetermined direction;

second command means for generating a second command for causing said cursor to move to a position of the display surface corresponding to said specific point;

map display control means for reading the map data from said memory means to cause said display means to display the road map on the display surface thereof;

present position display control means responsive to the distance signal from said distance detector means and the direction signal from said direction detector means for determining the amount of movement of the vehicle and for causing the displayed position of said cursor to move in accordance with the amount of movement;

first cursor movement control means for moving the displayed position of said cursor in the direction decided by the first command from said first command means; and second cursor movement control means responsive to the second command from said second command means for reading the position information of the specific point from said memory means to rapidly move said cursor to the position decided by said position information.

2. A navigator accordind to claim 1 wherein:

said memory means stores the position information of a plurality of specific points in the travelling region of the vehicle; and said second cursor movement control means sequentially moves said cursor among a plurality of positions on said display surface which are decided by the position information of a plurality of specific points read from said memory means, each time when the second command is generated from said second command means.

3. A navigator according to claim 1 further comprising:

third command means for generating a third command for storing the position information of the specific point; and memory control means responsive to the reception of the third command from said third command means for causing said memory means to store the position information of said cursor, upon said reception of the third command, as the position information of said specific point.

* * * * *